United States Patent Office 3,379,775
Patented Apr. 23, 1968

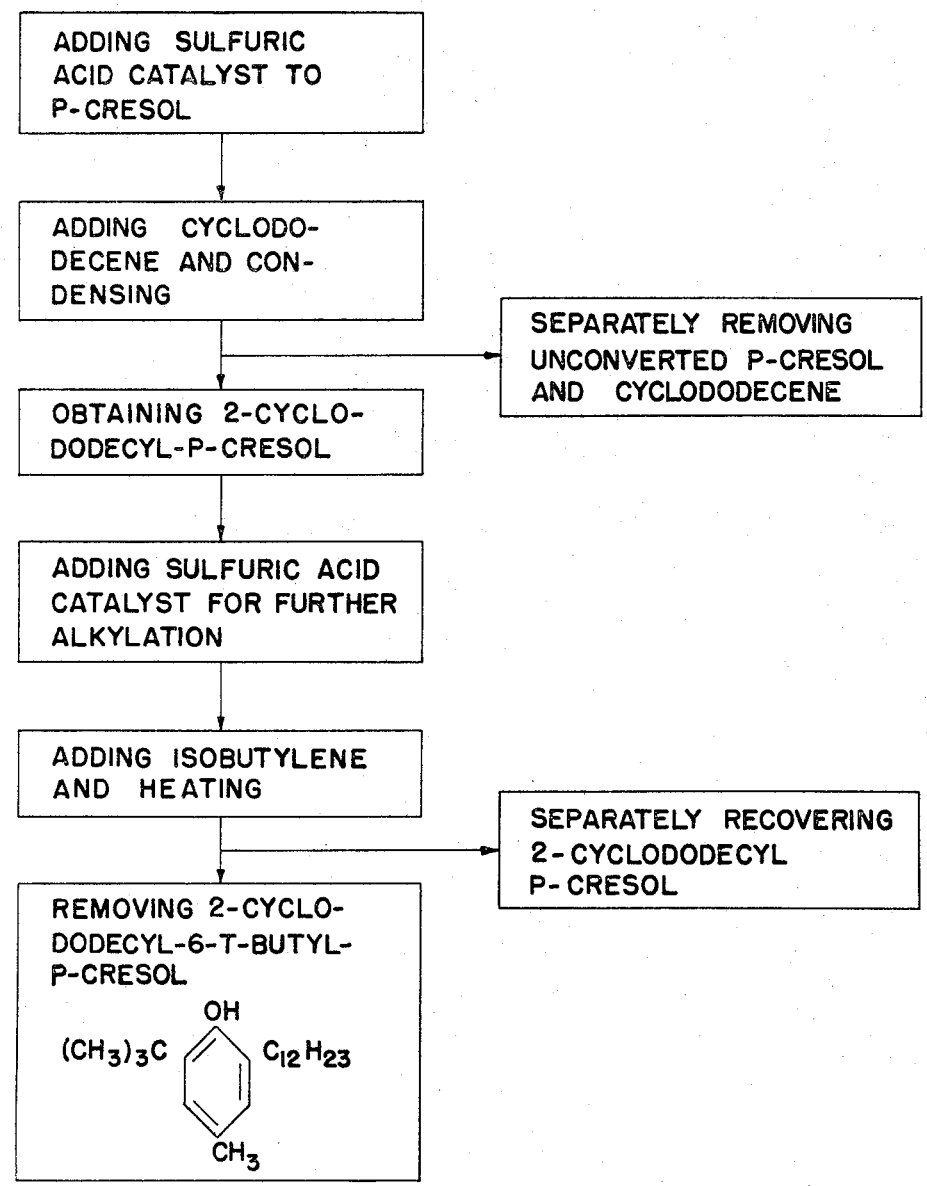

3,379,775
COMPOUND 2-CYCLODODECYL-
6-t-BUTYL-p-CRESOL
John E. Sheridan, Chesapeake, Va., and Eric B. Hotelling, Spring Valley, N.Y., assignors to Virginia Chemicals, a corporation of Maine
Filed Dec. 10, 1963, Ser. No. 329,512
1 Claim. (Cl. 260—624)

The present invention relates to a rubber anti-oxidant composition and method for synthesis.

There are numerous commercially acceptable rubber anti-oxidant compositions, including American Cyanamid Rubber Anti-Oxidant Composition 2246 and Shell Oil Company's trademarked product "Ionol." However, such rubber anti-oxidants are expensive to manufacture and oftentimes are dangerously volatile or have staining effects on rubber. Staining effects are particularly undesirable, of course, in the manufacture of white rubber. Applicants have developed an economical method for synthesis of a rubber anti-oxidant composition which is both non-volatile and non-staining. This anti-oxidant composition is readily synthesized from p-cresol, isobutylene and cyclododecene to yield 2-cyclododecyl-6-t-butyl-p-cresol which is a non-staining, non-volatile anti-oxidant for rubber having the desired aging characteristics.

Accordingly, it is an object of invention to provide a method for the synthesis of a rubber anti-oxidant composition at low cost.

Another object of the invention is to provide a method for synthesis of a rubber anti-oxidant composition which is non-staining and non-volatile.

Yet additional objects of invention will become apparent from the ensuing specification and attached drawing which is a flow-sheet, illustrating synthesis according to the present method.

In development of the present method, applicants studied various organic products derived from p-cresol and 2,4-xylenol. In this study cyclic $C_{12}$ unsaturated hydrocarbons, including cyclododecene and cyclododecatriene were condensed with p-cresol in the ortho-position. The other ortho-position carried a t-butyl group. The $C_{12}$ cyclic and straight chain unsaturated hydrocarbons were also condensed with 2,4-xylenol in the ortho-position. Examples of the hydrocarbons employed are n-dodecene-1, triisobutylene, cyclododecene and cyclododecatriene. Where yields of the various syntheses were acceptable, the products were tested as non-staining rubber antioxidants. Consequently, there was developed a non-staining rubber anti-oxidant having properties, equal to or better than commercially accepted anti-oxidants and synthesized at lower cost.

According to the present method, 216 grams of p-cresol were condensed by the dropwise addition of 332 grams of cyclododecene at 140° C. at the rate of 7.4 grams per minute, the condensation reaction being catalyzed by the addition of 6.5 grams of sulfuric acid. From this reaction there was recovered 71.3% of unconverted p-cresol and 95.8% of unconverted cyclododecene. There was a 61% yield of 2-cyclododecyl-p-cresol, based on converted p-cresol. This 2-cyclododecyl-p-cresol composition has a boiling point of 171° C. at 1.5 mm.

Eighty-three grams of the 2-cyclododecyl-p-cresol were butylated by adding 51 grams of isobutylene and heating in an autoclave from 50 to 150° C. for fifty minutes. This reaction was catalyzed through the addition of 0.8 grams of sulfuric acid. From this reaction there was recovered 16.4% unconverted 2-cyclododecyl-p-cresol and a 91.4% yield based on converted starting material of 2-cyclododecyl-6-t-butyl-p-cresol:

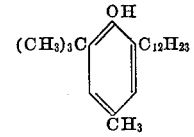

This 2-cyclododecyl-6-t-butyl-p-cresol composition had a boiling point of 158–164° C. at 0.3 mm.

Test results achieved independently by Smithers Laboratories of Akron, Ohio, were based on the following test formula:

TEST FORMULA

| | |
|---|---:|
| Pale crepe rubber | 100.00 |
| Azo 222–55 ZnO | 50.00 |
| $TiO_2$ (AlO) | 25.00 |
| Stearic acid | 2.00 |
| U.M. Blue | 0.125 |
| MBT | 1.00 |
| Sulfur | 3.00 |
| Anti-oxidant—2 - cyclododecyl - 6 - t - butyl-p-cresol | 1.00 |
| Total | 182.125 |

TENSION TESTING OF VULCANIZED RUBBER
Unaged physicals—Tested at room temperature (ASTM D412-51T—ASTM D599-55) and rubber cured with 2-cyclododecyl-6-t-butyl-p-cresol as an anti-oxidant

| 274° F. Cure | Modulus of elasticity at— | | Lbs./Sq. In. Tensile | Percent Elong. | Percent Set | Shore Hardness | T-50 (*), ° C. |
|---|---|---|---|---|---|---|---|
| | 300% | 500% | | | | | |
| 15' | 310 | 980 | 2,760 | 720 | 23 | 37 | +6.1 |
| 30' | 420 | 1,250 | 3,030 | 690 | 25 | 42 | −3.3 |
| 45' | 430 | 1,310 | 2,965 | 675 | 28 | 44 | −14.1 |
| 60' | 450 | 1,330 | 2,940 | 670 | 28 | 44 | −18.7 |
| Test Formula containing 2,2'-methylene-bis-(4-methyl-6-t-buytlphenol) | | | | | | | |
| 15' | 340 | 1,070 | 2,845 | 705 | 21 | 39 | +5.9 |
| 30' | 390 | 1,250 | 3,000 | 695 | 25 | 43 | −6.9 |
| 45' | 440 | 1,330 | 2,890 | 665 | 25 | 44 | −14.5 |
| 60' | 450 | 1,320 | 2,840 | 665 | 25 | 45 | −19.8 |
| Test Formula containing 2,6-di-t-butyl-p-cresol | | | | | | | |
| 15' | 390 | 1,230 | 3,175 | 710 | 19 | 37 | +6.2 |
| 30' | 500 | 1,550 | 3,180 | 665 | 21 | 43 | −4.7 |
| 45' | 510 | 1,490 | 3,130 | 665 | 25 | 44 | −13.5 |
| 60' | 520 | 1,450 | 2,975 | 655 | 25 | 44 | −18.9 |
| Test Formula containing 2-cyclododecyl-6-t-butyl-p-cresol | | | | | | | |
| 15' | 300 | 955 | 2,995 | 740 | 21 | 38 | +7.4 |
| 30' | 430 | 1,270 | 2,900 | 670 | 24 | 43 | −4.6 |
| 45' | 430 | 1,290 | 2,895 | 660 | 25 | 45 | −12.5 |
| 60' | 440 | 1,280 | 2,800 | 660 | 25 | 45 | −17.1 |

*Physical State of Cure of Vulcanized Rubber.

The modulus of elasticity is defined in ASTM Test Method E6–54T (page 1683) and is given as the ratio of stress to corresponding strain below the proportional limit. The modulus at 300% and 500% represents the ratio of stress to the corresponding strain in tests in which a length of 1″ distance marked on a specimen is stretched until the bench marks are 4″ (300%) apart or 6″ (500%) apart. The tensile test procedure used is described in ASTM Testing Method D412–51T, pages 1129 and 1131.

T–50 values given in the table of data by Smithers Laboratories refer to a test value gotten by determining the extent or physical state of cure of a rubber compound by measuring the temperature at which it recovers its elasticity when it is stretched at room temperature, frozen at a sufficiently low temperature to cause it to lose its elastic properties and then gradually warmed.

The T–50 test, which is described in ASTM Standard Test Method B599–55, is carried out as follows:

"A test specimen 1 to 2 in. in length and having a uniform cross-section is immersed in a liquid bath at 20° C., stretched to an elongation of 75 percent or more of the breaking elongation, and held for 5 min. It is then plunged into a bath of acetone at −50 to −70° C., held until cool, and released. The rubber will show practically no elastic retraction. The temperature is then raised slowly and the sample is found to contract, taking a definite length at a given temperature. The temperature on the centigrade scale at which the elongation of the sample becomes equal to one-half the initial elongation is the 'T–50 value'."

There are presented below comparative test results achieved from Oxygen Bomb Aged Physicals: Samples aged 168 hrs./300# .02/70° C.

| 274° F. Cure | Modulus at— 300% | Modulus at— 500% | Lbs./Sq. In. Tensile | Percent Elong. | Percent Set | Shore Hardness | Percent Weight Change |
|---|---|---|---|---|---|---|---|
| 30′ | 480 | 1,410 | 2,710 | 660 | 32 | 43 | +0.40 |
| 45′ | 510 | 1,310 | 2,150 | 625 | 37 | 43 | +0.63 |

Test Formula containing 2,2′-methylene-bis-(4-methyl-6-t-butylphenol)

| | | | | | | | |
|---|---|---|---|---|---|---|---|
| 30′ | 650 | 1,760 | 3,270 | 640 | 28 | 46 | +0.10 |
| 45′ | 660 | 1,720 | 2,970 | 630 | 29 | 47 | +0.17 |

Test Formula containing 2,6-di-t-butyl-p-cresol

| | | | | | | | |
|---|---|---|---|---|---|---|---|
| 30′ | 570 | 1,630 | 3,025 | 650 | 29 | 44 | +0.21 |
| 45′ | 560 | 1,500 | 2,645 | 635 | 31 | 44 | +0.33 |

Test Formula containing 2-cyclododecyl-6-t-butyl-p-cresol

| | | | | | | | |
|---|---|---|---|---|---|---|---|
| 30′ | 610 | 1,710 | 3,185 | 650 | 30 | 46 | +0.09 |
| 45′ | 620 | 1,650 | 2,790 | 625 | 34 | 46 | +0.27 |

AVERAGE OF THE 30′ AND 45′ CURE DATA

| Modulus at— 300% | Modulus at— 500% | Lbs./Sq. In. Tensile | Percent Elong. | Percent Set | Shore Hardness | Percent Weight Change | Percent of Original Ten. | Percent of Original Elong. |
|---|---|---|---|---|---|---|---|---|
| 495 | 1,360 | 2,330 | 645 | 35 | 43 | +0.52 | 78 | 94 |

Test Formula containing 2,2′-methylene bis-(4-methyl-6-t-butylphenol)

| | | | | | | | | |
|---|---|---|---|---|---|---|---|---|
| 655 | 1,740 | 3,120 | 635 | 29 | 47 | +0.14 | 106 | 93 |

Test Formula containing 2,6-di-t-butyl-p-cresol

| | | | | | | | | |
|---|---|---|---|---|---|---|---|---|
| 565 | 1,565 | 2,835 | 645 | 30 | 44 | +0.27 | 90 | 98 |

Test Formula containing 2-cyclododecyl-6-t-butyl-p-cresol

| | | | | | | | | |
|---|---|---|---|---|---|---|---|---|
| 615 | 1,680 | 2,990 | 640 | 32 | 46 | +0.18 | 103 | 97 |

PHYSICALS—SAMPLES AGED 14 DAYS AT 158° F.—HOT AIR OVEN

| 274° F. Cure | Modulus at— 300% | Modulus at— 500% | Lbs./Sq. In. Tensile | Percent Elong. | Percent Set | Shore Hardness | Percent Weight Change |
|---|---|---|---|---|---|---|---|
| 30′ | 680 | 1,970 | 3,585 | 655 | 25 | 48 | +0.17 |
| 45′ | 680 | 1,920 | 3,105 | 620 | 26 | 49 | −0.07 |

Test Formula containing 2,2′-methylene bis-(4-methyl-6-t-butylphenol)

| | | | | | | | |
|---|---|---|---|---|---|---|---|
| 30′ | 710 | 2,090 | 3,790 | 635 | 23 | 50 | −0.25 |
| 45′ | 710 | 1,930 | 3,470 | 635 | 24 | 50 | −0.18 |

Test Formula containing 2,6-di-t-butyl-p-cresol

| | | | | | | | |
|---|---|---|---|---|---|---|---|
| 30′ | 710 | 1,990 | 3,500 | 635 | 26 | 48 | −0.70 |
| 45′ | 670 | 1,890 | 3,130 | 630 | 25 | 49 | −0.58 |

Test Formula containing 2-cyclododecyl-6-t-butyl-p-cresol

| | | | | | | | |
|---|---|---|---|---|---|---|---|
| 30′ | 665 | 1,950 | 3,680 | 660 | 27 | 49 | −0.24 |
| 45′ | 690 | 1,960 | 3,380 | 635 | 27 | 49 | −0.17 |

AVERAGE OF THE 30′ AND 45′ CURE DATA

[Hot air oven aged 14 days/158° F.]

| Modulus at— | | Lbs./Sq. In. Tensile | Percent Elong. | Percent Set | Shore Hardness | Percent Weight Change | Percent of Original | |
|---|---|---|---|---|---|---|---|---|
| 300% | 500% | | | | | | Ten. | Elong. |
| 680 | 1,945 | 3,345 | 640 | 26 | 49 | −0.12 | 111 | 93 |
| Test Formula containing 2,2′-methylene bis-(4-methyl-6-t-butylphenol) | | | | | | | | |
| 710 | 2,010 | 3,630 | 635 | 24 | 50 | −0.22 | 123 | 93 |
| Test Formula containing 2,6-di-t-butyl-p-cresol | | | | | | | | |
| 690 | 1,940 | 3,315 | 635 | 26 | 49 | −0.64 | 105 | 97 |
| Test Formula containing 2-cyclododecyl-6-t-butyl-p-cresol | | | | | | | | |
| 680 | 1,955 | 3,530 | 605 | 27 | 49 | −0.20 | 122 | 98 |

TENSILE RETENTION

| Test Formula Containing— | Unaged | | Aged | | | |
|---|---|---|---|---|---|---|
| | | | Oxygen Bomb | | Hot Air Oven | |
| | Tensile | Elong. | Tensile | Elong. | Tensile | Elong. |
| 2,2′-methylene bis-(4-methyl-6-t-butylphenol) | 3,000 2,945 | 685 680 | 78 106 | 94 93 | 111 123 | 93 93 |
| 2,6-di-t-butyl-p-cresol | 3,155 | 655 | 90 | 98 | 105 | 97 |
| 2-cyclododecyl-6-t-butyl-p-cresol | 2,900 | 665 | 103 | 96 | 122 | 98 |

(Ozone exposure 50 parts per 100 million; 100° F. at 20% elongation; exposure period 24 hours. All samples showed some ozone cracking after 24 hours exposure.)

The samples cured 60 minutes at 274° F. were exposed for periods from 24 to 48 and 72 hours to the ultraviolet of the weatherometer and were found to be non-discoloring.

Also, 60-minute cure samples were dipped in white lacquer and exposed to ultra-violet light for periods of 24, 48 and 72 hours. No staining was found in these samples.

The present synthesis can be achieved from toluene via p-cresol at a raw material cost of 15 to 17 cents per pound. There is no loss of anti-oxidant effect and better color property in white rubber is provided. According to the related methods and using sulfuric acid as a catalyst, the following compositions have been obtained, yet have been rejected because of their poor staining characteristics or low activity: 2-cyclododecadienyl-p-cresol; 6-sec-dodecyl-2,4-xylenol; 6-cyclododecyl-2,4-xylenol; and 6-cyclododecadienyl-2,4-xylenol.

The composition 2-cyclododecyl-6-t-butyl-p-cresol is unique because it shows anti-oxidant activity where related compositions do not.

Manifestly, the conditions of synthesis including substitution of catalysts and variation in temperature, pressures, and preparations of reactants may be employed without departing from the spirit and scope of invention, as defined in the subjoined claim.

We claim:
1. The compound 2-cyclododecyl-6-t-butyl-p-cresol

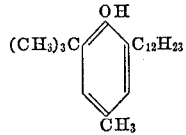

References Cited

UNITED STATES PATENTS 2,104,412  1/1938  Buc _____ 260—624
2,593,112  4/1952  Cross et al. _____ 260—624

FOREIGN PATENTS 758,474  10/1956  Great Britain.

BERNARD HELFIN, *Acting Primary Examiner.*

LEON ZITVER, *Examiner.*

W. LONE, *Assistant Examiner.*